Aug. 14, 1928.
S. MELTON
POWER FACTOR CONTROL FOR POWER DISTRIBUTION
Original Filed Nov. 10, 1925
1,681,005
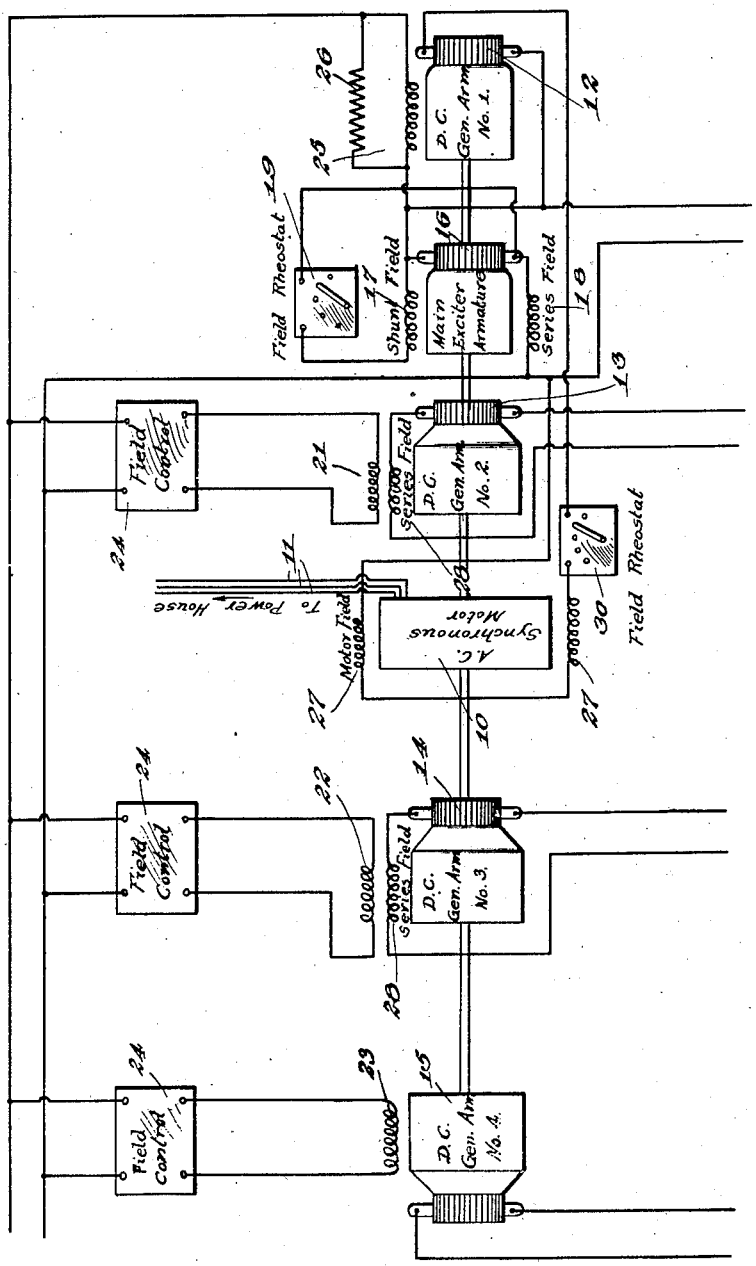
WITNESSES
INVENTOR
Sherman Melton,
BY
ATTORNEYS Patented Aug. 14, 1928.

1,681,005

UNITED STATES PATENT OFFICE.

SHERMAN MELTON, OF STURGIS, KENTUCKY.

POWER-FACTOR CONTROL FOR POWER DISTRIBUTION.

Original application filed November 10, 1925, Serial No. 68,219. Divided and this application filed June 9, 1926. Serial No. 114,770.

This invention relates to a power factor control system for power distribution systems.

The present application is a division of my pending application Serial No. 68,219 filed November 10, 1925.

In power transmission and distribution systems synchronous motors are commonly employed for driving direct current generators, the synchronous motors being connected to the alternating current power lines and the direct current generators supplying currrent for distribution. In systems of this character the power factor of the alternating current power system will usually lead during light load periods and lag during heavy load periods. This condition is due to the synchronous motors and unless corrected, results in low operating efficiency of the system.

The present invention relates particularly to a system wherein several direct current generators are driven by a synchronous motor and it is desired to maintain the power factor of the alternating current power system, to which the synchronous motor is connected, at unity.

The purpose of the present invention is to provide automatic regulating means whereby the above advantages may be accomplished.

Referring to the accompanying drawing the figure represents diagrammatically a synchronous alternating current motor for driving several direct current generators and a single field exciter, and certain connections whereby the present invention may be practiced.

Referring to the drawing more particularly 10 indicates an alternating current synchronous motor which may be connected to a three phase alternating current supply cables or wires 11 extended from a power plant. The motor 10 may drive the direct current generators indicated at 12, 13, 14 and 15 and a direct current exciter indicated at 16.

The exciter 16 may have a compound field comprising the usual shunt coil 17 and a series coil 18. The shunt field is provided with a rheostat 19. The generators 13, 14 and 15 are provided with fields 21, 22 and 23 respectively. Each field 21, 22 and 23 is provided with an adjustable resistance 24. The fields 21, 22 and 23 are connected parallel with each other and all connected in series with the armature of exciter 16, and also in series with the field coil 25 of the generator 12. The coil 25 of generator 12 may be shunted by a resistance 26 if desired.

The synchronous motor 10 has its field coils 27 connected in series with the armature of generator 12.

The generators 13, and 14 are shown with a series field 28 which may be employed. Also, the field circuit synchronous motor 10 is preferably provided with an adjustable resistance 30.

In the operation of the present system, strengthening of the auxiliary fields of the generators 13, 14 and 15 correspondingly increases the voltage of the generator 12 with respect to the exciter 16 and field of synchronous motor. The increase of voltage at output terminals of generator or booster 12 in turn strengthens the field of the synchronous motor 10 and consequently causes said motor to develop a greater counter electro motive force which acts to maintain the power factor of the power system, to which the motor 10 is connected, at approximately unity.

It will be noted that the voltage of the exciter proper in circuits of this character is intended to remain continuous and therefore I do not vary the voltage of the main exciter but do vary the voltage across the terminals of the synchronous motor field circuit by adding the voltage generated on the direct current generator 12 to the voltage already being applied to the synchronous motor field circuit. Since the added voltage is directly proportional to the load applied to the synchronous motor the power factor may be maintained at a predetermined value and may be caused to increase to lead with an increase in the load, or may cause the power factor to change from a lagging to a leading one. These variations may be accomplished by changing the resistance of the field circuits 25 and 27 for the direct current generator 12 and synchronous motor field circuits respectively.

What I claim is:

1. In a system of the character described, a synchronous motor driving a plurality of generators and an exciter, means whereby the exciter may be utilized for controlling the field of said generators, means whereby an increase of current from said exciter will in direct proportion raise the output voltage of one of said generators, and connecting means whereby the last named generator will supply the field current of said synchronous motor.

2. In a system of the character described, a synchronous motor, a plurality of direct current generators and a direct current field exciter driven by said synchronous motor, means whereby the exciter will control the fields of said generators, connecting means whereby the output current of the exciter will flow through a field coil of one of the generators, and means whereby the last named generator will supply the field of the synchronous motor.

3. In a system of the character described, a synchronous motor, a plurality of direct current generators and a direct current field exciter driven by the synchronous motor, connecting means whereby the output current of the exciter will flow through a field coil of one of the generators, means for supplying a field coil of each of the remaining generators from the exciter, and means for connecting the field of the synchronous motor to the generator having a field connected in series with the output terminals of the exciter.

SHERMAN MELTON.